(12) United States Patent
Choi et al.

(10) Patent No.: US 9,756,334 B2
(45) Date of Patent: Sep. 5, 2017

(54) DIGITAL TELEVISION SYSTEM (71) Applicant: LG ELECTRONICS INC., Seoul (KR)

(72) Inventors: In Hwan Choi, Gwacheon-si (KR); Young Mo Gu, Seoul (KR); Kyung Won Kang, Seoul (KR); Kook Yeon Kwak, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 14/254,606

(22) Filed: Apr. 16, 2014

(65) Prior Publication Data
US 2014/0226731 A1 Aug. 14, 2014

Related U.S. Application Data (63) Continuation of application No. 12/831,178, filed on Jul. 6, 2010, now Pat. No. 8,743,971, which is a (Continued)

(30) Foreign Application Priority Data

Sep. 26, 2000 (KR) .......................... 10-2000-56473

(51) Int. Cl.
*H04N 7/12* (2006.01)
*H04N 19/88* (2014.01)
(Continued)

(52) U.S. Cl.
CPC ....... *H04N 19/00927* (2013.01); *H04L 1/006* (2013.01); *H04L 1/0041* (2013.01);
(Continued)

(58) Field of Classification Search
USPC .............. 375/240.01–240.29; 370/207, 535; 341/50; 348/426.1, 723, E5.108
See application file for complete search history.

(56) References Cited

U.S. PATENT DOCUMENTS 4,980,897 A 12/1990 Decker et al.
5,087,975 A 2/1992 Citta et al.
(Continued)

FOREIGN PATENT DOCUMENTS

EP 0980185 A1 2/2000
KR 10-1997-0056904 7/1997
(Continued)

OTHER PUBLICATIONS

Advanced Television Systems Committee (ATSC), "ATSC Digital Television Standard," Doc. A/53, Sep. 1995.
(Continued)

*Primary Examiner* — Gims Philippe
(74) *Attorney, Agent, or Firm* — Birch, Stewart, Kolasch & Birch, LLP (57) ABSTRACT

A digital television system performing modulation/demodulation by VSB (vestigial side band) is provided. The invention includes a VSB transmitter including an additional error correction encoder designed such that a signal mapping of a TCM encoder is considered, a multiplexer (MUX), a TCM encoder operating in correspondence with state transition processes of the additional error correction encoder, and a signal transmission part including an RF converter. The invention further includes a VSB receiver including a signal receiver part receiving a signal transmitted from the transmitter, a TCM decoder, a signal processing part including a derandomizer, and an additional error correction decoder part.

4 Claims, 7 Drawing Sheets

Related U.S. Application Data continuation of application No. 11/932,521, filed on Oct. 31, 2007, now Pat. No. 8,428,150, which is a continuation of application No. 11/050,298, filed on Feb. 2, 2005, now Pat. No. 7,742,530, which is a continuation of application No. 09/962,263, filed on Sep. 26, 2001, now abandoned.

(51) Int. Cl.
| | |
|---|---|
| *H04L 1/00* | (2006.01) |
| *H04L 27/02* | (2006.01) |
| *H04N 5/44* | (2011.01) |
| *H04N 21/235* | (2011.01) |
| *H04N 21/236* | (2011.01) |
| *H04N 21/2383* | (2011.01) |
| *H04N 21/434* | (2011.01) |
| *H04N 21/435* | (2011.01) |
| *H04N 21/438* | (2011.01) |
| *H04L 29/06* | (2006.01) |

(52) U.S. Cl.
CPC .......... *H04L 1/0045* (2013.01); *H04L 1/0071* (2013.01); *H04L 27/02* (2013.01); *H04L 65/607* (2013.01); *H04N 5/4401* (2013.01); *H04N 19/88* (2014.11); *H04N 21/235* (2013.01); *H04N 21/2383* (2013.01); *H04N 21/23614* (2013.01); *H04N 21/435* (2013.01); *H04N 21/4348* (2013.01); *H04N 21/4382* (2013.01)

(56) References Cited

U.S. PATENT DOCUMENTS

| | | | |
|---|---|---|---|
| 5,233,630 A | 8/1993 | Wolf | |
| 5,309,290 A | 5/1994 | Sugiyama et al. | |
| 5,398,073 A | 3/1995 | Wei | |
| 5,416,801 A * | 5/1995 | Chouly | H04L 1/0071 370/207 |
| 5,488,691 A | 1/1996 | Fuoco et al. | |
| 5,555,024 A | 9/1996 | Limberg | |
| 5,563,884 A | 10/1996 | Fimoff et al. | |
| 5,583,889 A | 12/1996 | Citta et al. | |
| 5,600,677 A | 2/1997 | Citta et al. | |
| 5,602,595 A | 2/1997 | Citta et al. | |
| 5,629,958 A | 5/1997 | Willming | |
| 5,636,251 A | 6/1997 | Citta et al. | |
| 5,636,252 A | 6/1997 | Patel et al. | |
| 5,677,911 A * | 10/1997 | Fimoff | H03M 5/20 348/E5.108 |
| 5,686,966 A | 11/1997 | Cierva | |
| 5,692,013 A | 11/1997 | Koslov et al. | |
| 5,694,419 A | 12/1997 | Lawrence et al. | |
| 5,706,312 A | 1/1998 | Wei | |
| 5,737,337 A | 4/1998 | Voith et al. | |
| 5,757,861 A | 5/1998 | Lim | |
| 5,831,690 A | 11/1998 | Lyons et al. | |
| 5,894,549 A | 4/1999 | Cheng | |
| 5,909,454 A | 6/1999 | Schmidt | |
| 5,910,967 A | 6/1999 | Vanderaar | |
| 5,923,711 A | 7/1999 | Willming | |
| 5,946,047 A | 8/1999 | Levan | |
| 5,953,376 A | 9/1999 | Wei | |
| 5,991,341 A | 11/1999 | Shin | |
| 6,040,867 A | 3/2000 | Bando et al. | |
| 6,061,820 A | 5/2000 | Nakakita et al. | |
| 6,075,569 A | 6/2000 | Lee et al. | |
| 6,118,825 A | 9/2000 | Ikeda et al. | |
| 6,122,015 A | 9/2000 | Al-Dhahir et al. | |
| 6,141,384 A | 10/2000 | Wittig et al. | |
| 6,178,209 B1 | 1/2001 | Hulyalkar et al. | |
| 6,184,921 B1 | 2/2001 | Limberg | |
| 6,201,563 B1 | 3/2001 | Rhee | |
| 6,201,564 B1 | 3/2001 | Limberg | |
| 6,208,643 B1 | 3/2001 | Dieterich et al. | |
| 6,278,743 B1 | 8/2001 | Templin | |
| 6,311,013 B1 | 10/2001 | Shimizu et al. | |
| 6,490,001 B1 | 12/2002 | Shintani et al. | |
| 6,490,002 B1 | 12/2002 | Shintani | |
| 6,493,043 B1 | 12/2002 | Bollmann et al. | |
| 6,493,402 B1 | 12/2002 | Fimoff | |
| 6,501,748 B1 | 12/2002 | Belaïche | |
| 6,519,298 B1 | 2/2003 | Kim | |
| 6,529,558 B1 | 3/2003 | Fimoff et al. | |
| 6,601,209 B1 | 7/2003 | Lewis et al. | |
| 6,687,310 B1 * | 2/2004 | Fimoff | H04L 1/0054 348/E5.108 |
| 6,690,738 B1 | 2/2004 | Swenson et al. | |
| 6,697,098 B1 | 2/2004 | Wang | |
| 6,708,149 B1 | 3/2004 | Turin | |
| 6,724,439 B1 | 4/2004 | Horwitz | |
| 6,724,832 B1 | 4/2004 | Hershberger | |
| 6,738,949 B2 | 5/2004 | Senda et al. | |
| 6,743,025 B2 | 6/2004 | Howard | |
| 6,744,822 B1 | 6/2004 | Gaddam et al. | |
| 6,760,077 B2 | 7/2004 | Choi et al. | |
| 6,785,903 B1 | 8/2004 | Kuh | |
| 6,788,710 B1 | 9/2004 | Knutson et al. | |
| 6,810,084 B1 | 10/2004 | Jun et al. | |
| 6,810,090 B1 | 10/2004 | Perlow | |
| 6,876,623 B1 | 4/2005 | Lou et al. | |
| 6,888,840 B1 | 5/2005 | Ramaswamy et al. | |
| 6,889,351 B1 | 5/2005 | Meehan | |
| 6,901,113 B2 | 5/2005 | Le Strat et al. | |
| 6,927,708 B2 * | 8/2005 | Fimoff | H03M 7/3082 341/50 |
| 6,947,487 B2 | 9/2005 | Choi et al. | |
| 6,958,781 B2 | 10/2005 | Fimoff | |
| 6,996,133 B2 | 2/2006 | Bretl et al. | |
| 7,073,116 B1 | 7/2006 | Settle et al. | |
| 7,197,685 B2 | 3/2007 | Limberg | |
| 7,206,352 B2 * | 4/2007 | Birru | H04L 1/0059 348/426.1 |
| 7,215,714 B2 | 5/2007 | Bretl et al. | |
| 7,489,755 B2 | 2/2009 | Wang et al. | |
| 7,630,451 B2 | 12/2009 | Collins et al. | |
| 7,755,704 B2 | 7/2010 | Choi et al. | |
| 7,787,053 B2 | 8/2010 | Choi et al. | |
| 7,787,054 B2 | 8/2010 | Choi et al. | |
| 8,059,718 B2 | 11/2011 | Choi et al. | |
| 8,081,666 B2 * | 12/2011 | Bretl | H03M 13/253 370/535 |
| 8,254,512 B2 | 8/2012 | Gaal et al. | |
| 2001/0021229 A1 | 9/2001 | Belaiche | |
| 2001/0036232 A1 | 11/2001 | Betts et al. | |
| 2001/0055342 A1 | 12/2001 | Fimoff | |
| 2002/0041608 A1 | 4/2002 | Choi et al. | |
| 2002/0041634 A1 | 4/2002 | Choi et al. | |
| 2002/0066061 A1 | 5/2002 | Classon et al. | |
| 2002/0085632 A1 | 7/2002 | Choi et al. | |
| 2002/0095640 A1 | 7/2002 | Arad et al. | |
| 2002/0140867 A1 * | 10/2002 | Weiss | H04N 5/38 348/723 |
| 2002/0152441 A1 | 10/2002 | Senda et al. | |
| 2002/0191712 A1 * | 12/2002 | Gaddam | H04L 1/0041 375/301 |
| 2003/0021341 A1 | 1/2003 | Vigil et al. | |
| 2003/0067992 A1 | 4/2003 | Karaoguz et al. | |
| 2004/0028076 A1 | 2/2004 | Strolle et al. | |
| 2004/0066738 A1 | 4/2004 | Stopler | |
| 2004/0158798 A1 | 8/2004 | Senda et al. | |
| 2004/0207757 A1 | 10/2004 | Fimoff | |
| 2004/0240590 A1 | 12/2004 | Cameron et al. | |
| 2005/0041748 A1 | 2/2005 | Choi et al. | |
| 2005/0041749 A1 | 2/2005 | Choi et al. | |
| 2005/0074069 A1 | 4/2005 | Choi et al. | |
| 2005/0129132 A1 | 6/2005 | Choi et al. | |
| 2005/0254605 A1 | 11/2005 | Holmes et al. | |
| 2006/0002464 A1 | 1/2006 | Choi et al. | |
| 2006/0039503 A1 | 2/2006 | Choi et al. | |
| 2008/0049146 A1 | 2/2008 | Choi et al. | |

(56) References Cited

U.S. PATENT DOCUMENTS

2008/0049874 A1  2/2008 Choi et al.
2008/0063104 A1  3/2008 Gardner et al.
2008/0089408 A1  4/2008 Choi et al.

FOREIGN PATENT DOCUMENTS

| KR | 10-1999-0065541 | 8/1999 |
|----|-----------------|--------|
| KR | 10-0253000 | 1/2000 |
| KR | 10-2000-0018531 | 4/2000 |
| KR | 10-2000-0028757 | 5/2000 |

OTHER PUBLICATIONS

R. Citta et al., "ATSC Transmission System: VSB Tutorial," Montreuz Symposium, Jun. 1997.
DAVIC, Digital Audio-Visual Council, "Lower Layer Protocols and Physical Interfaces (Technical Specification)," DAVIC 1.31 Specification Part 8, 1998, 288 pages.
U.S. Appl. No. 12/856,433, Office Action dated Dec. 11, 2013, 10 pages.
Bretl, U.S. Appl. No. 60/198,014, filed Apr. 18, 2000.
S. Benedetto et al. "A soft-input soft-output maximum a posteriori (MAP) module to decode parallel and serial concatenated codes" TDA progress report 42-127, Nov. 15, 1996.

\* cited by examiner

DIGITAL TELEVISION SYSTEM

CROSS-REFERENCE TO RELATED APPLICATIONS

This application is a continuation of U.S. application Ser. No. 12/831,178, filed Jul. 6, 2010, currently pending, which is a continuation of U.S. application Ser. No. 11/932,521, filed Oct. 31, 2007, now U.S. Pat. No. 8,428,150, issued Apr. 23, 2013, which is a continuation of application Ser. No. 11/050,298, filed Feb. 2, 2005, now U.S. Pat. No. 7,742,530, issued Jun. 22, 2010, which is a continuation of U.S. application Ser. No. 09/962,263, filed Sep. 26, 2001, abandoned, which pursuant to 35 U.S.C. §119, claims the benefit of earlier filing date and right of priority to Korean Application No. 10-2000-56473, filed Sep. 26, 2000, the contents of all of which are hereby incorporated by reference herein in their entirety.

FIELD OF THE INVENTION

The present invention relates to a digital television system carrying out modulation/demodulation by VSB (vestigial side band).

RELATED ART

An 8VSB transmission system for terrestrial wave digital broadcasting is taken as a U.S. standard system in 1995 is test-broadcasted from the latter half of the year 1998. Such a test broadcasting using a terrestrial wave digital broadcasting standard based on the U.S. standard system is being carried out in Korea as well.

In such a digital broadcasting system, a transmitted signal is received by a receiver through a terrestrial channel. In order to restore the signal in the receiver despite the noise caused by the channel, the signal is variously coded to be transmitted. In response to the various coding process, the receiver carries out the corresponding decoding process so as to restore the transmitted signal.

Lately, a broadcasting station tries to transfer such a digital broadcasting, which transfers mainly audio and video data, to which various additional data are attached. The additional data includes stock-market information, weather casting, program guide information, HTML, execution files and the like.

Figure 1:
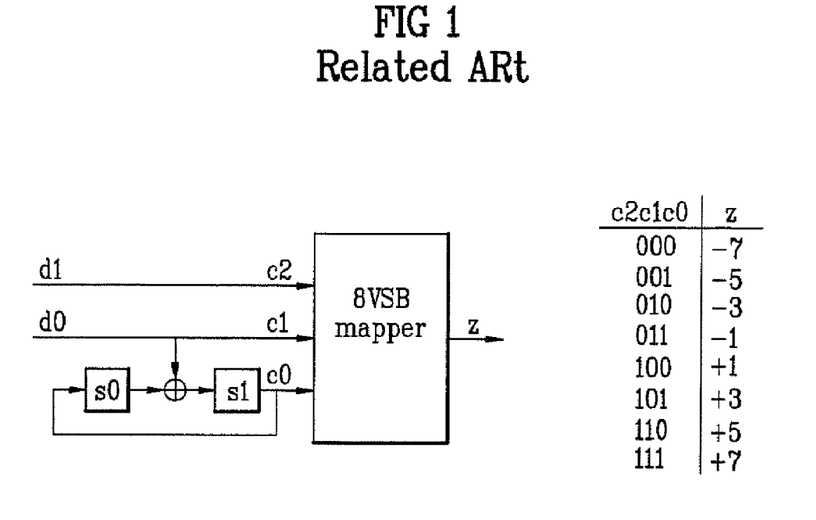
FIG. 1 illustrates a TCM encoder and a signal mapper in an ATSC 8VSB system according to a related art.
Figure 2:
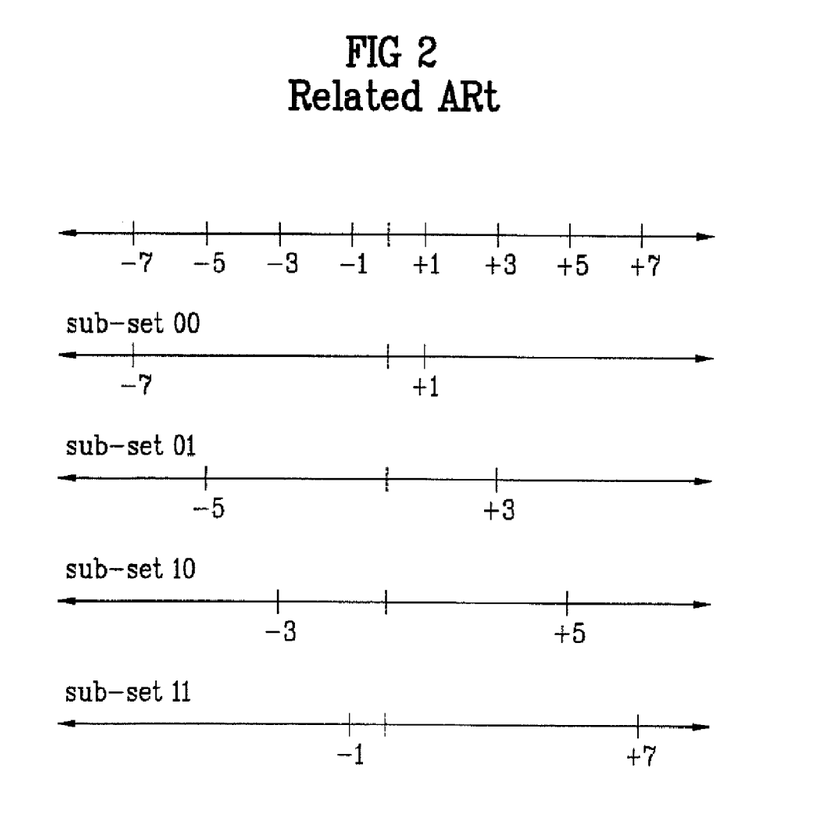
FIG. 2 illustrates a diagram for a set partitioning used in the TCM encoder in FIG. 1.
Figure 3:
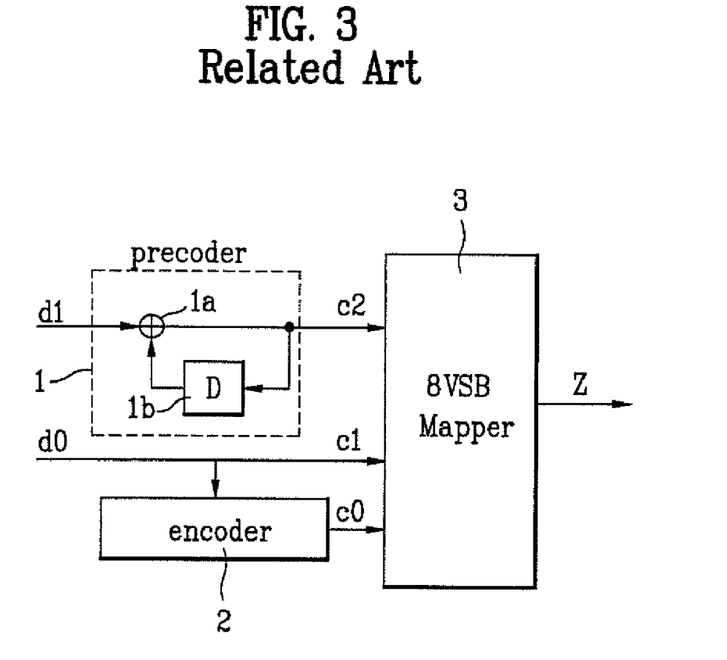
FIG. 3 illustrates a structural diagram of a TCM encoder according to a related art.

FIG. 3 illustrates a structural diagram of a TCM encoder according to a related art.

Referring to FIG. 3, a TCM encoder includes a precoder 1 outputting a first output signal by precoding a first input bit d1 and an encoder outputting a third output signal by encoding a second input bit as a second output signal c1, where a reference numeral '3' indicates a 8VSB mapper.

Meantime, the precoder 1 includes an adder 1a outputting the first output signal c2 by adding the first input bit d1 to a delayed signal and a memory 1b providing the adder 1a with the delayed signal attained by delaying an output signal of the adder 1a.

The TCM encoder according to a related art may cause a fatal damage on the additional data when using it.

Different from general audio/video data in channel transmission, the additional data is vulnerable fatally to an influence of the channel noise. For example, the damaged additional data of which information itself is defected may inform a viewer with wrong information, while the damaged general audio/video data just result in light image/voice loss. Specifically, when the additional data include numbers or an execution file, a minor data error causes a devastating result of failing the entire operation.

SUMMARY OF THE INVENTION

Accordingly, the present invention is directed to a digital television system that substantially obviates one or more problems due to limitations and disadvantages of the related art.

An object of the present invention is to provide a digital television system fitting for transmitting additional data.

Another object of the present invention is to provide a digital television system robust to a noise.

A further object of the present invention is to provide a digital television system compatible with a conventional digital television system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a VSB transmitter includes an additional error correction encoder carrying out state transition processes on additional data inputted to correct an error and designed for a TCM coding to be considered wherein the TCM coding will be carried out later, a multiplexer multiplexing the additional data and Advanced Television Systems Committee (ATSC) data wherein the additional and ATSC data are inputted thereto, a TCM encoder operating in a manner corresponding to the state transition processes of the additional error correction encoder and encoding the ATSC and additional data outputted from the multiplexer, and a signal transmission part converting the ATSC and additional data outputted from the TCM encoder into an RF (radio frequency) signal and transmitting the RF signal to a receiver.

In another aspect of the present invention, a VSB receiver includes an RF tuner tuning RF signal transmitted from a VSB transmitter, a VSB demodulator demodulating IF signal outputted from the RF tuner, a TCM decoder decoding the ATSC data and additional data, a deinterleaver deinterleaving soft output of the TCM decoder, a limiter carrying out a hard decision on the soft-outputted ATSC data, an RS decoder decoding the hard-outputted ATSC data, a derandomizer derandomizing the ATSC data having passed through the RS decoder, and an additional error correction decoder part carrying out an error correction on the soft-outputted additional data.

Preferably, the TCM decoder in the VSB receiver is a decoder producing a soft output signal with a soft input signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
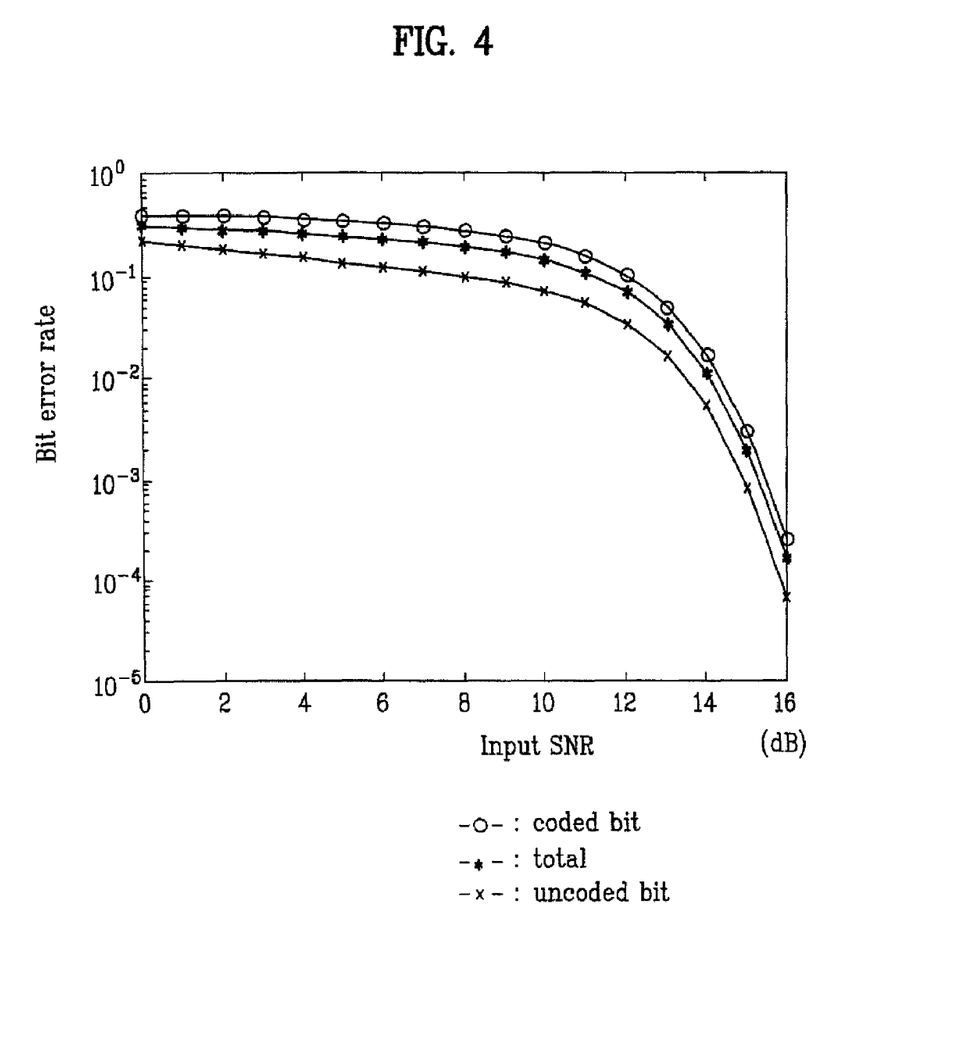
FIG. 4 illustrates a performance graph of a TCM encoder in an 8VSB system on an AWGN (additive white Gaussian noise) channel.

FIG. 4 illustrates a performance graph of a TCM code of an 8VSB system in AWGN (additive white Gaussian noise) channel.

A bit error rate of an uncoded bit d1, another bit error rate of a coded bit d0, and a total bit error rate when regarding the uncoded and coded bits d1 and d0 as one stream are shown in FIG. 4.

Referring to FIG. 4, the bit error rate of the uncoded bit is lower than that of the coded bit. And, the bit error rate of the entire bits corresponds to an average between the respective bit error rates of the uncoded and coded bits. It is because a sub-set is determined by the coded bit, while a signal in the determined sub-set is determined by the uncoded bit.

When a set partitioning of the TCM code, a performance of the uncoded bit determining signals in the sub-set is superior to that of the coded bit since a distance between signals in one sub-set is allotted so as to be longer than that that between signals two different subsets.

In use of such a characteristic, data having a higher significance are inputted using the uncoded bit d1 having a relatively lower bit error rate than the coded bit d0 and another data having a less significance are inputted using the coded bit c0 having a higher bit error rate than the uncoded bit d1. Therefore, it is able to design a more efficient digital television system.

Figure 5:
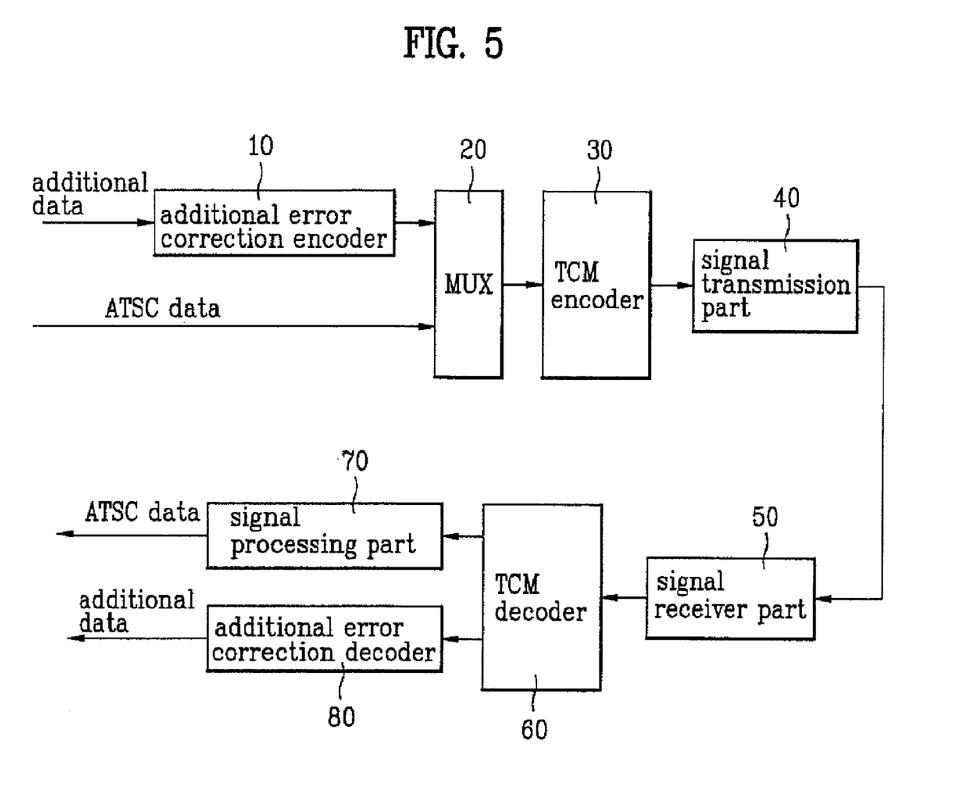
FIG. 5 illustrates a VSB communication system according to the present invention.

FIG. 5 illustrates a VSB communication system according to the present invention.

Referring to FIG. 5, the VSB communication system is divided into a VSB transmitter and a VSB receiver.

The VSB transmitter is constructed with an additional error correction encoder 10 encoding additional data to correct an error thereof additionally and designed in a manner that a signal mapping of a TCM encoder is considered, a multiplexer (MUX) 20 multiplexing an output signal of the additional error correction encoder 10 and inputted ATSC data, a TCM encoder 30 operating in a manner corresponding to state transition processes of the additional error correction encoder 10, and a signal transmission part 40 transmitting an output of the TCM encoder 30 as a radio base to a receiver side.

The VSB receiver is constructed with a signal receiver part 50 receiving a signal transmitted from the signal transmission part 40, i.e. a transmitter side, a TCM decoder 60 decoding a signal outputted from the signal receiver part 50, a signal processing part 70 processing an output signal of the TCM decoder 60, and an additional error correction decoder 80 restoring the additional data by decoding the output signal of the TCM decoder 60 additionally.

The signal processing part 70 is constructed with a limiter limiting the output signal of the TCM decoder 60, an RS decoder decoding an output signal of the limiter, and a derandomizer derandomizing an output signal of the RS decoder.

Figure 6:
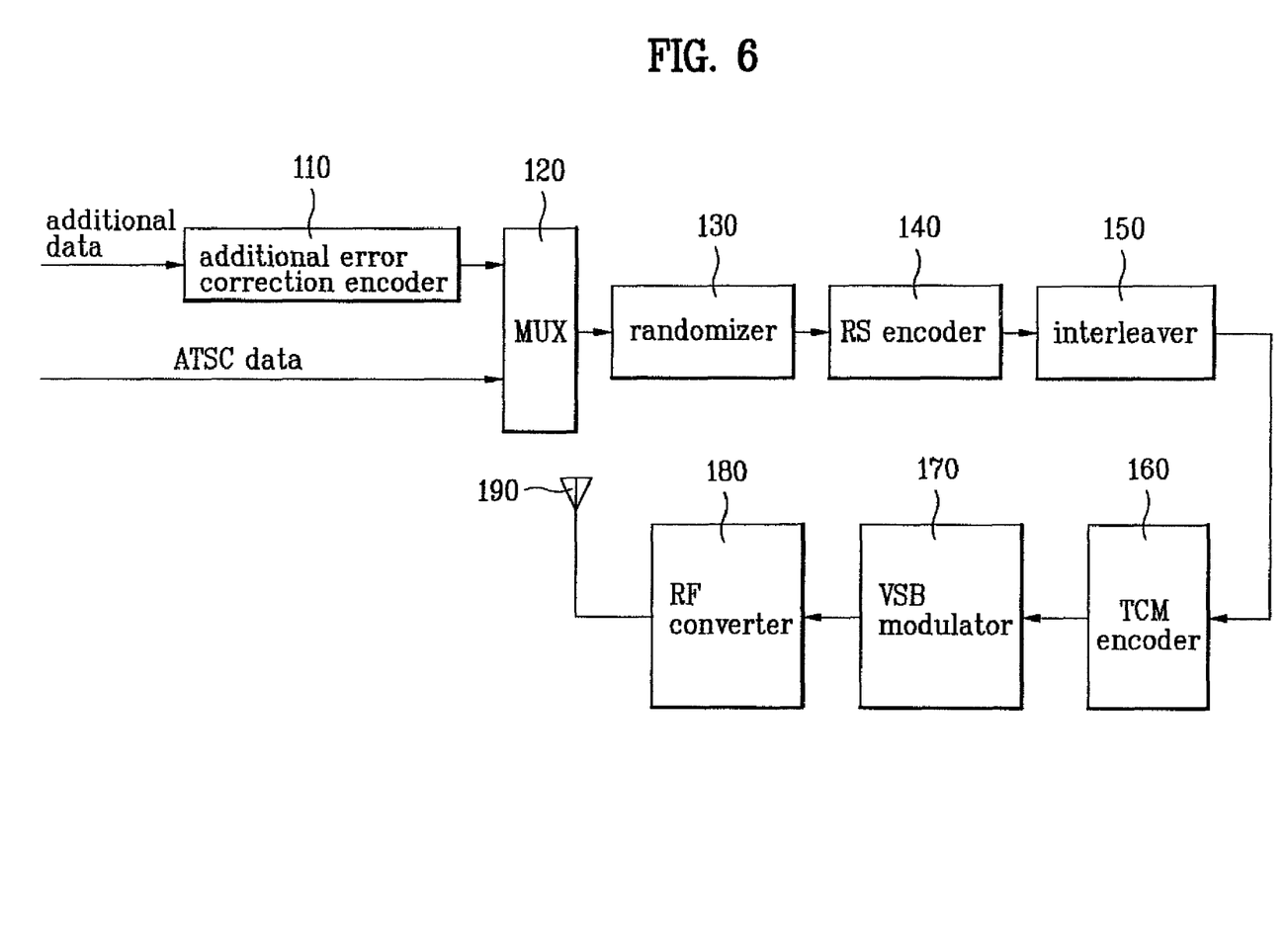
FIG. 6 illustrates a VSB transmitter according to the present invention.

FIG. 6 illustrates a VSB transmitter according to the present invention.

Referring to FIG. 6, a VSB transmitter is constructed with an additional error correction encoder 110 carrying out an encoding for correcting an error additionally on additional data, a multipluxer (MUX) 120 multiplexing the additional data and the general ATSC data failing to pass through the additional error correction encoder 110, a randomizer 130 randomizing an output signal of the multiplexer 120, an RS (reed-solomon) encoder 140 RS-encoding an output signal of the randomizer 130 to add a parity code, an interleaver 150 interleaving an output signal of the RS encoder 140 to protect transmission data from a burst noise possibly occurring on a transmission channel, a TCM encoder 160 encoding an output signal of the interleaver 150 into a TCM code, a VSB modulator 170 VSB-modulating an output signal of the TCM encoder 160, an RF converter 180 converting an output signal of the VSB modulator 170 into an RF signal, and a transmission antenna 190 transmitting the RF signal to a receiver side.

Figure 7:
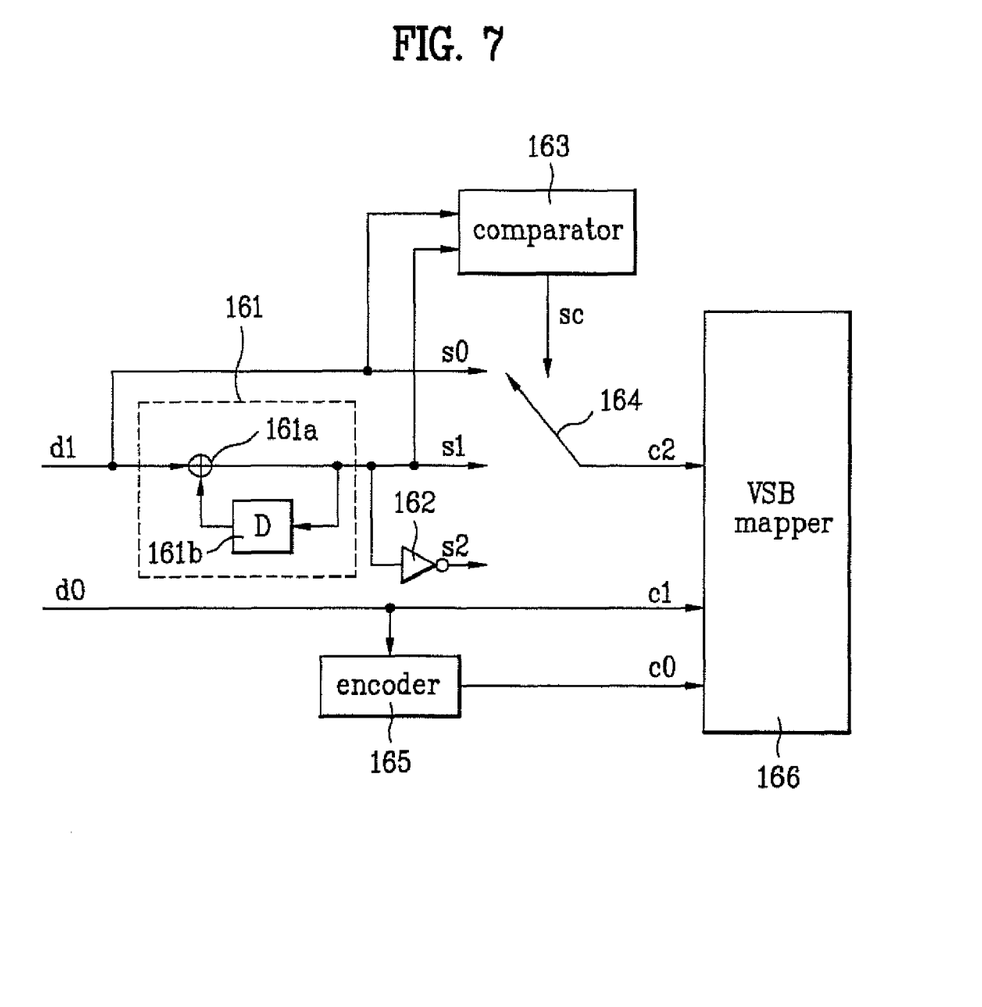
FIG. 7 illustrates a TCM encoder according to the present invention.

FIG. 7 illustrates a detailed construction of the TCM encoder 160 in FIG. 6 according to the present invention, where the TCM encoder 160 is transformed from a conventional precoder.

Referring to FIG. 7, a TCM encoder is constructed with a precoder 161 outputting a second switch input signal s1 by precoding a first input bit d1 as a first switch input signal s0, an inverter 162 outputting a third switch input signal s2 by inverting the second switch input signal s1, a comparator 163 providing a switching control signal by comparing the first and second switch input signals s0 and s1 each other, a switch 164 selectively outputting one of the first to third switch input signals s0 to s2 as a first output signal c2, and an encoder 165 encoding a second input bit d0 as a second output signal c1 so as to output a third output signal c0 And, a reference numeral '166' indicates a VSB mapper.

When the first input bit d1 is additional data, the input bit d1 is output through the switch s0. At this time, the input bit d1 is also input to the precoder 161. When the first input bit d1 is ATSC data, the input bit d1 is divided into two depending on the last bit of the additional data. If the output of the switch s0 at the last bit is equal to the output of the switch s1, an output value of the precoder is output, If not so, an inverse value of the precoder is output.

Meanwhile, the precoder 161 includes an adder 161a outputting the second switch input signal s1 by adding the first input bit d1 and a delayed signal each other and a memory 161b providing the adder 161a with a signal attained by delaying an output signal of the adder 161a for a predetermined time.

The above operations on the first bit d1 is to bypass the precoder in case of additional symbol and maintain compatibility with the related art VSB receiver. The term "compatibility" means that even though the precoder is bypassed in case of additional symbol, the related art VSB receiver can decode ATSC data symbol without error.

The operation of the VSB transmitter is explained in detail as follows.

Different from the general ATSC data, the additional data for additional services such as an execution file, HTML and the like require the additional error correction encoder 110 for preventing a performance degradation caused by the noise.

First, for error correction, the additional data having passed through the additional error correction encoder 110 and the general ATSC data failing to pass through the additional error correction encoder 110 are multiplexed by the multiplexer 120 so that one of the additional and ATSC data is outputted.

Subsequently, the additional or ATSC data passed through the multiplexer 120 enter the randomizer 130.

In this case, the additional data bypasses the randomizer 130, while the ATSC data becomes random through the randomizer 130.

A parity is then added to the additional data and the ATSC data passed through the randomizer 130 in the RS (reed-solomon) encoder 140. And, the additional and ATSC data are interleaved in the interleaver 150 so as to protect the transmission data from the burst noise might occur in the transmission channel.

Then, the additional and ATSC data outputted from the interleaver 150 are encoded again in the TCM encoder 160.

As mentioned in the above explanation, the additional and ATSC data passed through the TCM encoder 160 are free from errors even if the additional data are inputted thereto, which is different from the case using the conventional precoder failing to have the switching function in FIG. 3.

For instance, let's assume that a bit 0 is put in the memory 1b of the precoder 161 in FIG. 3 and that a bit stream inputted into the precoder is the following a1.

10110<u>01000010111011</u>001 (a1), where underlines beneath the stream a1 indicates an additional data interval which is additional-error-correction-encoded.

When the additional data interval of the bit stream a1 fails to pass through the precoder 161 and the ATSC code interval passes through the precoder 161, the following bit stream a2 is attained.

110110<u>100011011011</u>001 (a2)

If all of the bit stream a2 pass through a post decoder, an output of the post decoder is represented by the following bit stream a3.

101101<u>110010110110</u>101 (a3)

In the bit stream a3, a bit 1 denoted by a bold (darkened) numeral of 1 belongs to the previous ATSC data interval, which means that an error occurs. Namely, comparing the input bit stream a1 to the output bit stream a3 of the post decoder, the darkened bit of the output bit stream a3 of the post decoder is changed in the previous ATSC data interval excluding the additional data interval (the underlined bits).

However, after the input bit stream a1 passes through the TCM encoder 160 corresponding to the modified precoder in FIG. 7, the following stream a4 shows up.

11011<u>01000110111011</u>110 (a4)

After all of the bit stream a4 pass through the post decoder, the post decoder outputs the following bit stream a5.

101101<u>110010110110</u>001 (a5)

Hence, after the input stream a1 having passed through the modified predecoder passes the post decoder, the bit stream a5 outputted from the post decoder becomes equal to the input bit stream a1 in the previous ATSC data interval. Namely, no bit stream error takes place in the previous ATSC data interval.

Figure 8:
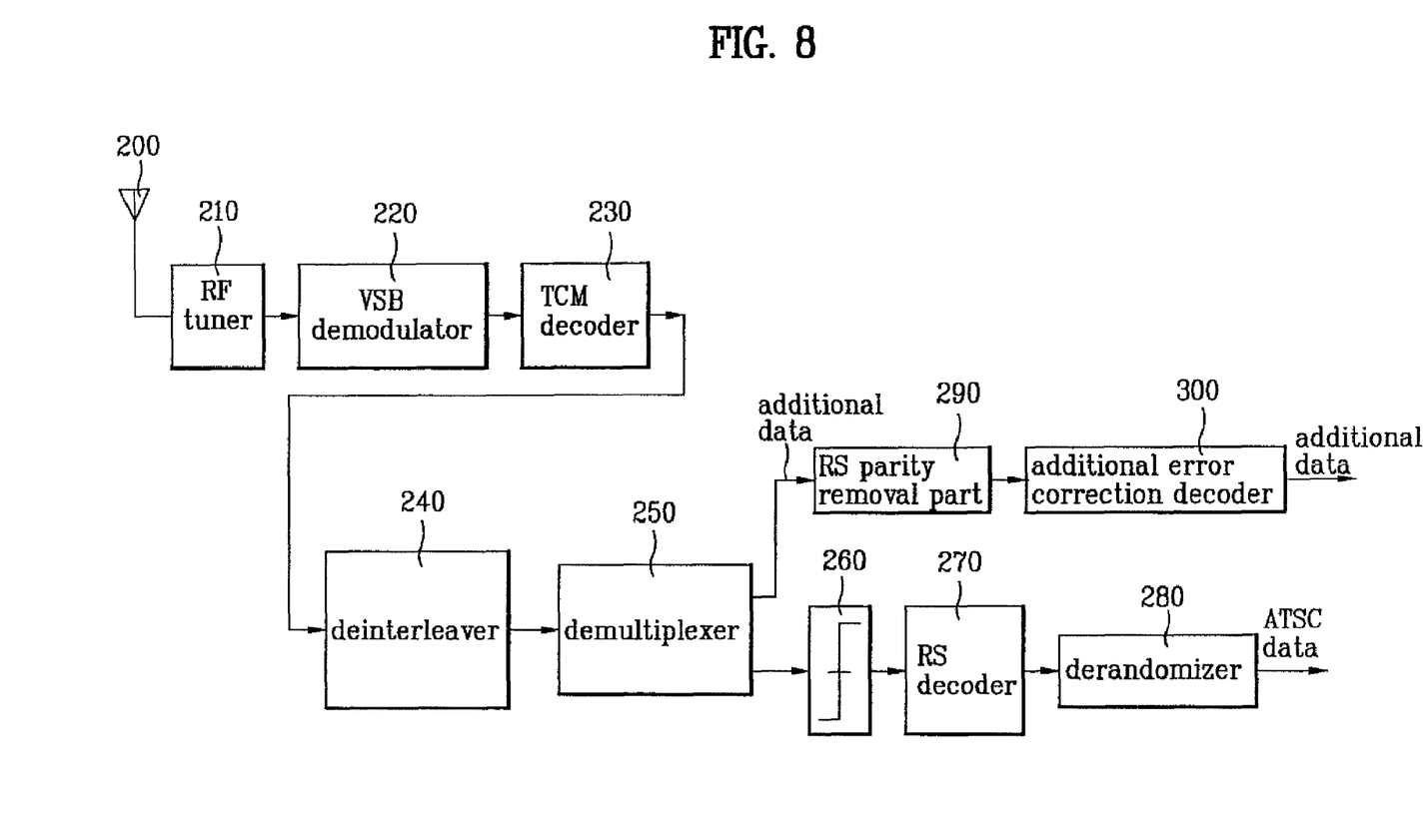
FIG. 8 illustrates a VSB receiver according to the present invention.

FIG. 8 illustrates a diagram of a VSB receiver according to the present invention.

Referring to FIG. 8, the VSB receiver is constructed with an RF (radio frequency) tuner tuning the RF signal received through an antenna 200, a VSB demodulator 220 demodulating IF signal outputted from the RF tuner 210, a TCM decoder 230 decoding an output signal of the VSB demodulator 220 and then providing soft output, a deinterleaver 240 deinterleaving the ATSC and additional data having the soft signal form outputted from the TCM decoder 230, a demultiplexer 250 dividing the data outputted from the deinterleaver 240 into the additional data and the ATSC data and then outputting the divided data, a limiter 260 deciding the ATSC data outputted from the demultiplexer 250, an RS decoder 270 decoding an output signal of the limiter 260, a derandomizer 280 derandomizing an output signal of the RS decoder 270, an RS parity removal part 290 removing a parity from the additional data outputted from the demultiplexer 250, and an additional error correction decoder part 300 decoding an output signal of the RS parity removal part 290 for error correction.

Operation of the VSB receiver is explained as follows.

First, the additional and ATSC data received from the VSB transmitter through the antenna 200 are tuned through the RF tuner 210.

The ATSC and additional data outputted from the RF tuner 220 are demodulated through the VSB demodulator 220. the output signal of the VSB demodulator 220 is decoded by the TCM decoder 230 so as to be outputted as the soft signal form.

At this moment, the TCM decoder 230 should produce a soft output in order to maximize a performance of the additional error correction encoder 110 in the transmitter shown in FIG. 6.

SOVA (soft output viterbi algorithm) and MAP (maximum A posteriori) are algorithms for producing a soft output for a trellis coded data. In aspect of a symbolic error, the MAP algorithm is superior to SOVA.

However, the optimal MAP algorithm has disadvantages such as a calculation of probability in an exponential domain and a presumption of a noise variance of a transmission channel.

Besides, there is SSA (suboptimum soft output algorithm) as a sort of the MAP algorithm, in which a probability is calculated in a logarithmic domain without reducing a performance of the receiver and the presumption of the noise variance is unnecessary.

Therefore, if the SSA algorithm is used as a decoding algorithm, four soft outputs, which are shown in the following calculation formula e1, are produced for the input bits d1 and d0 of the additional error correction encoder 110.

$L(00) \propto \_\text{Log } P(d1d0 = 00 | \text{observation})$ $L(01) \propto \_\text{Log } P(d1d0 = 01 | \text{observation})$ $L(10) \propto \_\text{Log } P(d1d0 = 10 | \text{observation})$ $L(11) \propto \_\text{Log } P(d1d0 = 11 | \text{observation})$ \hfill (e1)

The soft outputs produced by the SSA decoder are measurements of the probability values for four kinds of combinations of "d1" and "d0" attained after the decoding. Meanwhile, when a convolutional code as an external code is used, these soft outputs are directly used as the branch metric.

Successively, the ATSC and additional data of the soft signal form outputted from the TCM decoder 230 are deinterleaved in the deinterleaver 240.

In this case, the ATSC data, which are outputted from the deinterleaver 240 are made random in the randomizer 130 of the transmitter, come to pass through the derandomizer 280. Besides, as the derandomizer 280 needs a hard signal form, hard decision should be carried out on the ATSC data outputted from the deinterleaver 240 as the soft form.

Yet, the hard decision process is unnecessary for the additional data, which are outputted from the deinterleaver 240 and fail to pass through the derandomizer 280.

Therefore, in order to carry out the hard decision process on the ATSC data outputted from the deinterleaver 240, the ATSC data pass through the limiter 260 and the RS decoder 270 in order and then are inputted to the derandomizer 280.

However, in order to remove the parity added thereto in the transmitter without the hard decision process, the additional data outputted from the deinterleaver 240 pass through the RS parity removal part 290 and then go by way of the additional error correction decoder part 300.

As mentioned in the above description, the digital communication system according to the present invention enables to carry out a data transmission of a high reliance having a signal to noise ratio by adding an additional error correction encoder having a desirable state transition property when used with the mapping of the TCM encoder to an outside of the TCM encoder, thereby enabling to improve a performance of the digital communication system.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of processing data in a transmission system, the method comprising:
    encoding first data received via a first path;
    multiplexing the encoded first data and second data, wherein the second data are received via a second path that is different from the first path;
    bypassing a randomizing process on the first data in the multiplexed data and performing the randomizing process on the second data in the multiplexed data;
    interleaving the first data on which the randomizing process is bypassed and the second data on which the randomizing process is performed; and
    transmitting the interleaved data.

2. The method of claim 1, wherein the first data and the second data include at least audio or video data.

3. An apparatus of transmitting data, the apparatus comprising:
    an encoder to encode first data received via a first path;
    a multiplexer to multiplex the encoded first data and second data, wherein the second data are received via a second path that is different from the first path;
    a randomizer to bypass a randomizing process on the first data in the multiplexed data and perform the randomizing process on the second data in the multiplexed data;
    an interleaver to interleave the first data bypassed by the randomizer and the second data randomized by the randomizer; and
    a transmitter to transmit the interleaved data.

4. The apparatus of claim 3, wherein the first data and the second data include at least audio or video data.

* * * * *